US012796617B2

(12) United States Patent
Isaac et al.

(10) Patent No.: US 12,796,617 B2
(45) Date of Patent: Nov. 17, 2026

(54) STRAW CHOPPER COUNTER KNIFE BAR WITH BLADE BETWEEN CONCAVE AND KNIFE BAR PIVOT

(71) Applicant: CNH Industrial America LLC, New Holland, PA (US)

(72) Inventors: Nathan E. Isaac, Lancaster, PA (US); Cooper Linde, Lancaster, PA (US); Garrett Fjeld, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 324 days.

(21) Appl. No.: 18/631,574

(22) Filed: Apr. 10, 2024

(65) Prior Publication Data

US 2024/0341237 A1 Oct. 17, 2024

Related U.S. Application Data

(60) Provisional application No. 63/459,058, filed on Apr. 13, 2023.

(51) Int. Cl.

*A01D 90/04* (2006.01)
*A01F 12/40* (2006.01)
*A01F 29/04* (2006.01)

(52) U.S. Cl.

CPC .............. *A01D 90/04* (2013.01); *A01F 12/40* (2013.01); *A01F 29/04* (2013.01)

(58) Field of Classification Search

CPC .... A01D 41/1243; A01D 43/08; A01D 90/04; A01D 90/06; A01D 12/40; A01F 29/01;

(Continued)

(56) References Cited

U.S. PATENT DOCUMENTS 7,993,187 B2 * 8/2011 Ricketts .................. A01F 12/40 56/10.2 J
8,141,805 B1 * 3/2012 Isaac ....................... A01F 12/40 241/242

(Continued)

FOREIGN PATENT DOCUMENTS

CN 105101779 A 11/2015
DE 102016104697 A1 9/2017

(Continued)

OTHER PUBLICATIONS

The Extended European Search Report issued Dec. 23, 2024, by the European Patent Office in corresponding European Patent Application No. 24167754.1-1105. (6 pages).

*Primary Examiner* — Adam J Behrens

(74) *Attorney, Agent, or Firm* — Buchanan Ingersoll & Rooney PC

(57) ABSTRACT

An agricultural residue chopper assembly comprising: a cutting chamber housing with cutting knives rotatable along a cutting direction within the cutting chamber, and a rotatable counterknife shaft unit. The shaft unit is mounted at a rotation axis near an outer surface of the cutting chamber housing, and has an outer face and one or more counterknives extending outward from the outer face. The shaft unit is rotatable to move the counterknives closer and further from the cutting knives' rotation axis. The outer face and the outer surface of the cutting chamber housing define a trailing area in which a gap distance between the outer face and the outer surface of the cutting chamber housing remains constant or increases in size as the counterknife shaft unit is rotated to move the counterknives closer to the cutting blade axis. An agricultural harvester machine having a residue chopper assembly is also provided.

12 Claims, 5 Drawing Sheets

(58) Field of Classification Search
CPC .......... A01F 29/02; A01F 29/04; A01F 29/06; A01F 29/09; A01F 29/095
See application file for complete search history.

(56) References Cited

U.S. PATENT DOCUMENTS

| | | | | |
|---|---|---|---|---|
| 8,187,064 | B2 * | 5/2012 | Schlesser | A01F 12/40 241/32 |
| 9,227,193 | B2 * | 1/2016 | Dilts | A01F 29/04 |
| 10,201,128 | B2 * | 2/2019 | Weichholdt | A01D 41/00 |
| 11,612,107 | B2 * | 3/2023 | Duquesne | A01F 12/40 460/112 |
| 12,471,535 | B2 * | 11/2025 | Dilts | A01D 41/1243 |
| 2002/0119809 | A1 * | 8/2002 | Bognar | A01F 29/02 460/112 |
| 2009/0111549 | A1 | 4/2009 | Farley et al. | |
| 2015/0038201 | A1 * | 2/2015 | Brinkmann | A01F 12/40 460/112 |
| 2017/0099771 | A1 * | 4/2017 | Linde | A01F 29/095 |
| 2023/0148476 | A1 * | 5/2023 | Dilts | A01D 41/1243 460/112 |

FOREIGN PATENT DOCUMENTS

| | | | |
|---|---|---|---|
| EP | 2540151 | B1 | 5/2013 |
| EP | 2000019 | B1 | 12/2015 |
| EP | 2910106 | B1 | 9/2016 |

* cited by examiner

STRAW CHOPPER COUNTER KNIFE BAR WITH BLADE BETWEEN CONCAVE AND KNIFE BAR PIVOT

BACKGROUND OF THE INVENTION

Agricultural machines, such as combine harvesters, typically process crop material, and deposit a portion of the material on the ground behind the machine. As the purpose of the harvester is to collect grain, the material that is deposited is primarily material other than grain ("MoG"), such as chaff and stalks. This is commonly called "residue." It is generally desirable to minimize the size of the residue pieces, and to spread the residue evenly across the path of the machine. For this purpose, the machine may include a chopper to reduce the residue size, and a spreader to distribute the residue.

The chopper typically comprises a series of knives that rotate on a shaft and are partially enclosed by a shroud that forms a chopper housing. The residue enters the shroud, and the knives strike and cut the residue. A typical chopper also has counterknives that extend radially towards the shaft, and between adjacent pairs of the rotating knives. The counterknives face towards the incoming stream of residue, and provide additional cutting edges. The counterknives can be mounted on their own shaft or on a support that can be moved to extend and retract the counterknives.

Typical counterknives are positioned below the chopper housing, such as below a concave pan assembly that forms the bottom part of the chopper housing. Examples of such devices are shown in U.S. Pat. Nos. 7,484,350, 7,677,965, and 8,141,805, which are incorporated herein by reference. The counterknives are mounted on a pivoting support that is rotated to move the counterknife blades up to enter the chopper housing. In this arrangement, the pivot axis is located forward of the blades, and the blades trail behind the pivot axis with respect to the flow direction of the residue. The blades are mounted to a plate that extends generally radially and backwards from the pivot axis, with the counterknife blades oriented generally tangentially to the pivot axis.

Having the counterknives spaced behind the pivot axis is helpful to minimize changes in the orientation of the counterknives as they enter the chopper housing. In particular, it can be desirable to maintain the counterknives' leading edges at a particular range of angles relative to the rotating chopper knives, to thereby maintain ideal chopping effectiveness and efficiency. The angle or range of angles between the counterknives and the chopper knives can also be maintained by mounting the counterknives along a linear sliding path to enter and exit the chopper housing.

While such rotating and sliding arrangements can be effective, it has been found that residue can become trapped between the outer face of the chopper pan and the plate or other structure to which the counterknives are mounted. Residue can also become trapped in a gap formed between the counterknives and the outer face of the chopper pan while the counterknives are in the retracted position. Such residue is compressed as the counterknife assembly is moved into the extended position. This can lead to increased operating power requirements, frequent servicing requirements, and possible damage to the parts.

The inventors have determined that further improvements can be made to agricultural machine counterknife assemblies.

This description of the background is provided to assist with an understanding of the following explanations of exemplary embodiments, and is not an admission that any or all of this background information is necessarily prior art.

SUMMARY OF THE INVENTION

An agricultural residue chopper assembly comprising: a cutting chamber housing defining a cutting chamber therein; a plurality of cutting knives mounted to rotate along a cutting direction within the cutting chamber about a cutting knife rotation axis; a counterknife shaft unit mounted at a fixed location relative to an outer surface of the cutting chamber housing, wherein the counterknife shaft unit is rotatable about a counterknife shaft rotation axis through a range of motion between a first position and a second position, and wherein the counterknife shaft rotation axis extends parallel to the cutting knife rotation axis; an outer face defined by a portion of the counterknife shaft unit; one or more counterknives secured to the counterknife shaft unit and extending radially outward from the outer face, wherein the one or more counterknives are spaced a first distance from the cutting knife rotation axis when the counterknife shaft unit is in the first position, and a second distance from the cutting knife rotation axis when the counterknife shaft unit is in the second position, and the second distance is less than the first distance. The outer face and the outer surface of the cutting chamber housing define a trailing area located between a first line extending between the cutting knife rotation axis and the counterknife shaft rotation axis, and a second line that is parallel to the first line and spaced from the first line along a tangent to the cutting direction, and the outer face is configured such that a gap distance, as measured parallel to the first line, between the outer face and the outer surface of the cutting chamber housing at all locations within the trailing area remains constant or increases in size as the counterknife shaft unit is rotated from the first position to the second position.

Also provided is an agricultural harvester machine comprising: a chassis configured for movement on a surface; and a residue chopper assembly as described in the first example.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide choppers and counterknives that may be used in agricultural equipment (e.g., combines, windrowers, etc.), or in other environments. However, the invention is not limited to any particular application except as may be specifically recited in the claims.

Figure 1:
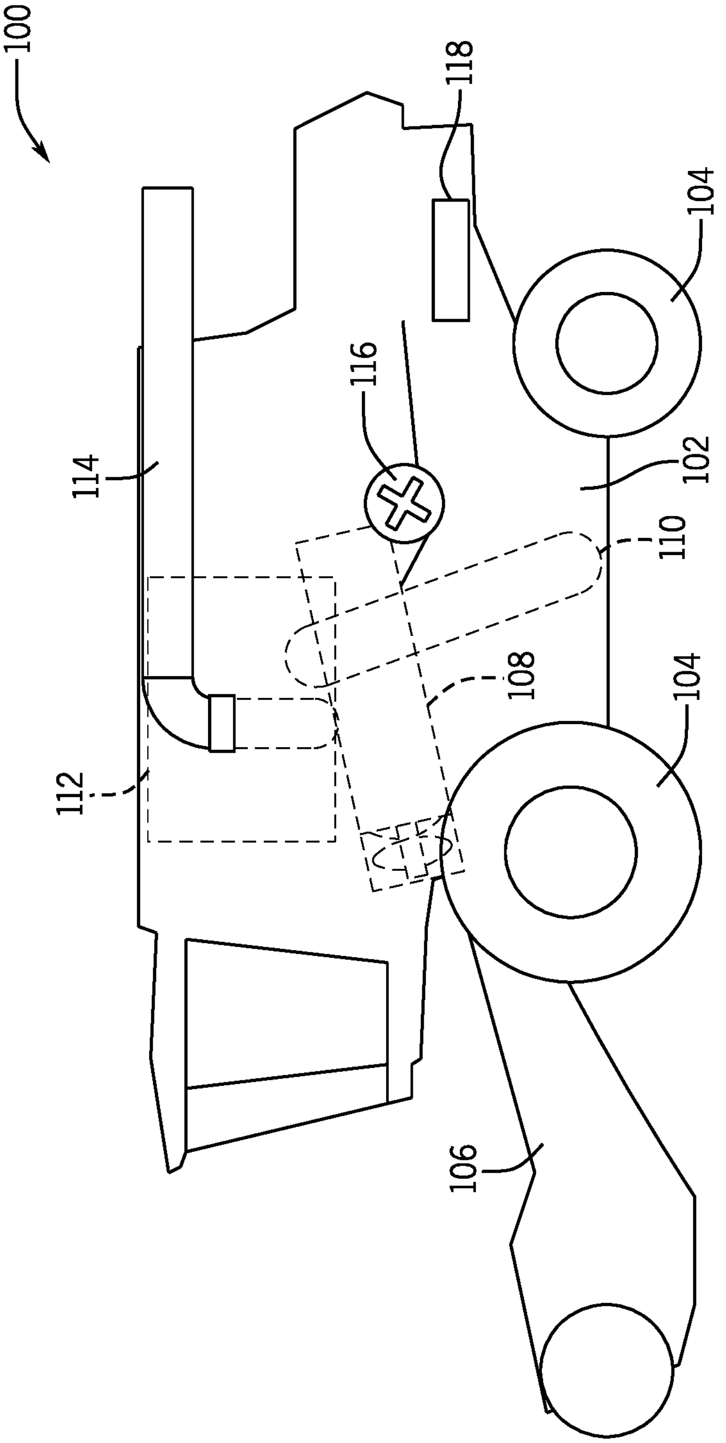
FIG. 1 schematically illustrates a side view of an example of an agricultural combine having residue chopper features such as described herein.

Referring to FIG. 1, an example of an agricultural combine 100 is schematically illustrated. The combine 100 includes a chassis 102 that is supported for movement on the ground by wheels 104 (e.g., pneumatic tires or tracked wheels). A header assembly 106 is attached to the combine 100 and configured to receive crop material and convey such material to a threshing and separating system 108 located in or on the chassis 102. The threshing and separating system 108 separates grain from the remaining crop material (also known as "straw," "material other than grain," "MoG," "crop residue," or simply "residue") and an auger 110 or the like conveys the grain to a grain hopper 112. The threshing and separating system may comprise an axial flow thresher, twin axial flow thresher, crossflow thresher, and so on. An unloader boom 114 may be provided to remove the separated grain as the combine 100 operates.

The residue exits the threshing and separating system 108 and falls into, or is otherwise conveyed to, a crop residue chopper 116, such as those described herein. The residue chopper 116 comminutes the residue, and the residue is then delivered to a spreader 118 that distributes the residue behind the combine 100.

The features described in relation to FIG. 1 are generally conventional, except for the residue chopper 116, and no further explanations of their structures or operations are necessary.

Figure 2:
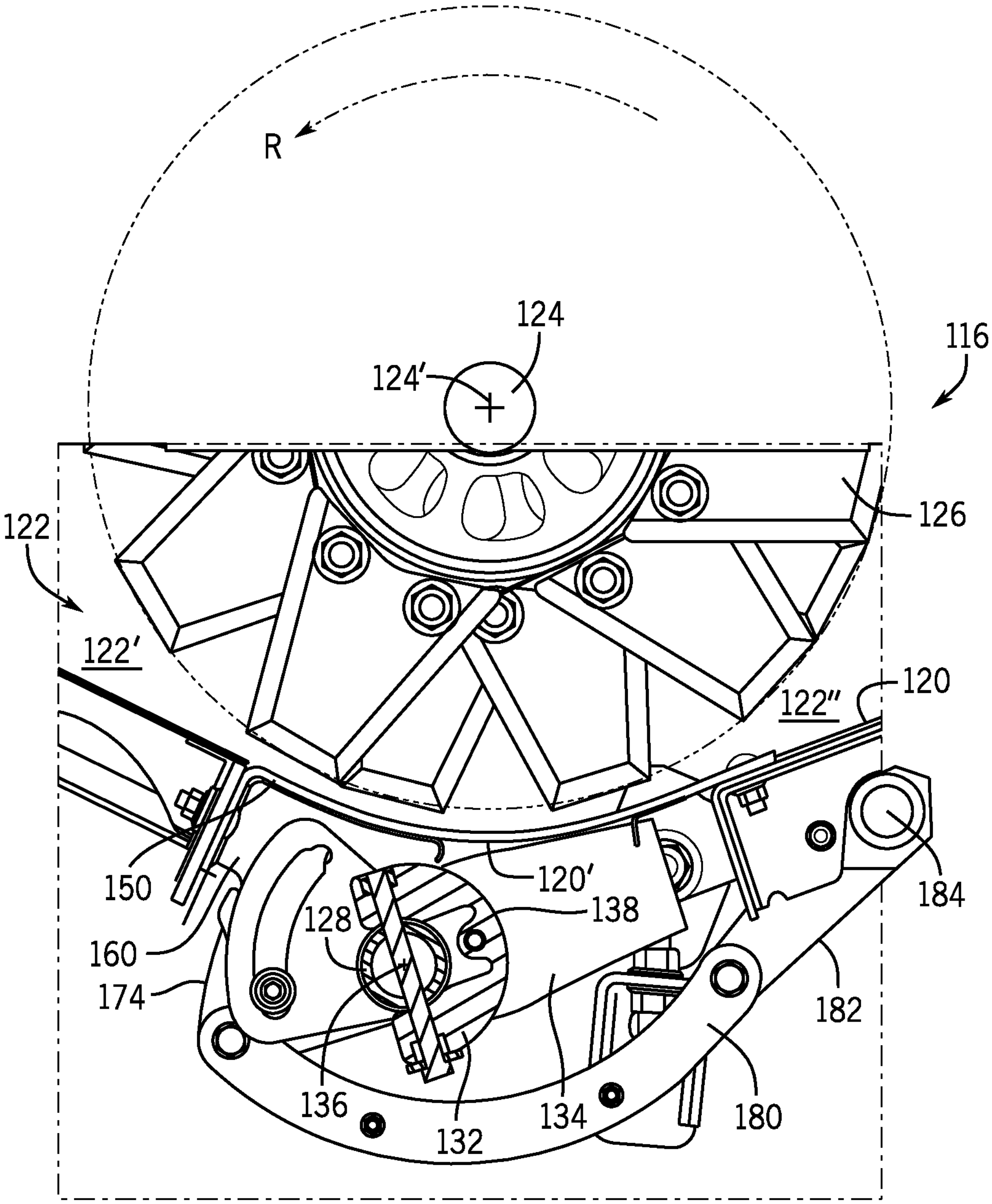
FIG. 2 is a cross-section view of a crop residue chopper having an exemplary embodiment of a residue counterknife assembly.
Figure 3:
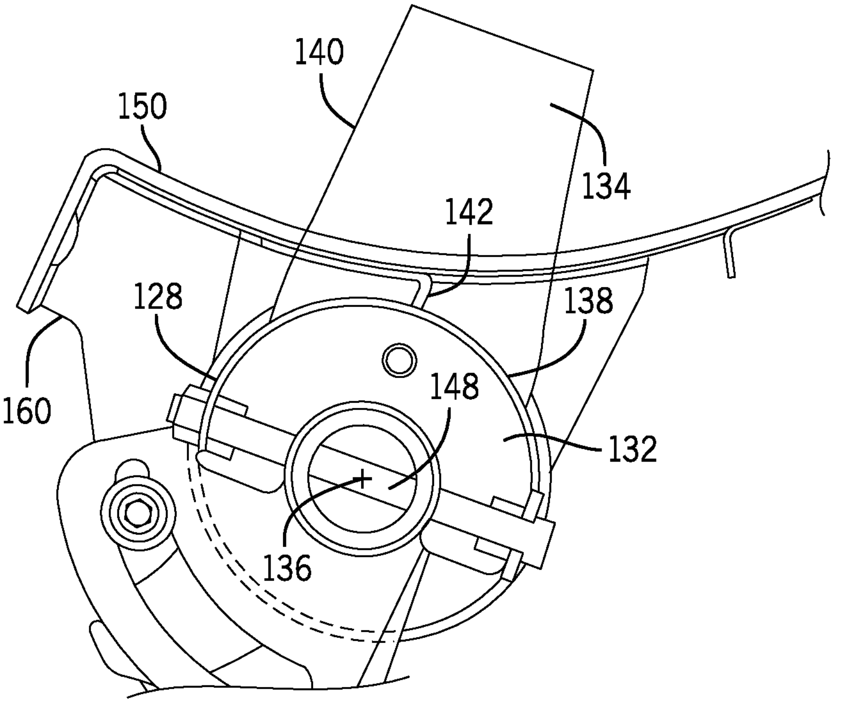
FIG. 3 is a cross-section view of the residue counterknife assembly of FIG. 2 in an extended position.
Figure 4:
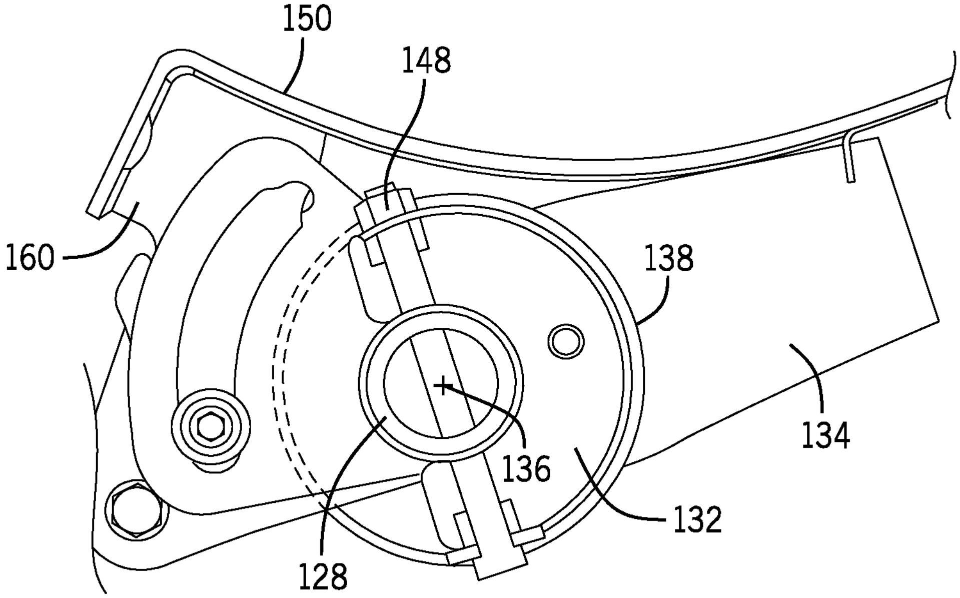
FIG. 4 is a cross-section view of the residue counterknife assembly of FIG. 2 in a retracted position.

Details of an exemplary crop residue chopper 116 are shown in more detail in FIGS. 2-4. The crop residue chopper 116 generally includes a housing 120 that defines a cutting chamber 122, a shaft 124 mounted in the cutting chamber 122 to rotate about a cutting knife rotation axis 124', and a plurality of cutting knives 126 mounted on the shaft 124 to rotate within the cutting chamber 122 in a cutting direction R. The cutting knives 126 may be rigidly fixed to the shaft 124 or connected by pivoting links (i.e., flail-type connections). The housing 120 is configured with an infeed opening 122' to direct residue into the path of the cutting knives 126, and an outfeed opening 122" to expel the chopped residue. The housing 120, cutting chamber 122, shaft 124, and cutting knives 126 may have any suitable or conventional construction, as known in the art, and need not be described in further detail herein.

The crop residue chopper 116 also includes a counterknife system comprising a counterknife shaft 128 to which counterknives 134 are attached by one or more bolts, screws, or other fasteners. In this case, the counterknives 134 are attached to the counterknife shaft 128 by knife holders 132 having one or more counterknives 134 mounted thereon. The knife holders 132 may be integral to the counterknife shaft 128, or separate parts that are attached to the counterknife shaft 128. Any number of counterknives 134 may be attached along the length of the counterknife shaft 128. The counterknife shaft 128 and knife holders 132 (excluding the counterknives 134) are referred to herein as the counterknife shaft unit.

The counterknife shaft 128 is mounted at a fixed location relative to an outer surface 120' of the cutting chamber housing 120, and is rotatable about a counterknife shaft rotation axis 136 that extends parallel to the cutting knife rotation axis 124'. The outer surface 120' is generally cylindrical about the cutting knife rotation axis 124', at least at the location adjacent to the counterknife assembly. The counterknife shaft 128 and knife holders 132 (i.e., the counterknife shaft unit) are rotatable through a range of motion between a first position (FIG. 4) and a second position (FIG. 3).

The counterknife shaft 128 may be fixed in the desired position using any suitable structure. In this case, the counterknife shaft 128 is mounted on two or more counterknife shaft supports 160 by bearings, bushings or the like. The counterknife shaft supports 160 may be secured to the housing 120, or to a portion of the housing 120 defined by a removable chopper pan 150. In other cases, the counterknife shaft supports 160 may be mounted to other structures, such as another part of the chopper assembly or the chassis of the vehicle. Other alternatives and embodiments will be apparent to persons of ordinary skill in the art in view of the present disclosure.

The counterknife shaft 128 may be rotated between the first and second positions using any suitable drive mechanism. In the shown example, one or more lever arms 174 are secured at one end to the counterknife shaft 128 and at the other end to respective drive links 180. The drive links 180 connect to drive levers 182 mounted to the chopper pan 150 or to any other suitable structure, such as the vehicle chassis 102. The drive levers 182 are secured to a common rotatable drive shaft 184, so that the drive levers 182 rotate in unison about the drive shaft's rotation axis, which preferably is parallel to the counterknife shaft rotation axis 136. The drive shaft 184 is rotated about its axis by an actuator (not shown), such as a hydraulic piston and cylinder assembly that is secured to the drive shaft 184 by a drive lever, gears, a chain and sprocket assembly, or the like. Other alternatives and embodiments will be apparent to persons of ordinary skill in the art in view of the present disclosure.

The counterknives 134 are secured to the counterknife shaft unit, and rotate with the counterknife shaft unit between the first and second positions. FIGS. 2 and 4 show the counterknife shaft unit in the first position. In this position, the counterknives 134 are spaced a first distance from the cutting knife rotation axis 124', and may be completely outside the cutting chamber 122, or partially within the cutting chamber 122. In some cases, the edges of the counterknives 134 may be at or slightly within the boundary of the cutting chamber outer surface 120', such that any gap between the counterknives 134 and cutting chamber outer surface 120' is minimized or reduced to zero.

FIG. 3 shows the counterknife shaft unit in the second position. In this position, the counterknives 134 are spaced a second distance from the cutting knife rotation axis 124', with the second distance being less than the first distance. This is the fully-extended position of the counterknives 134, in which they intermesh to the greatest degree with the cutting knives 126. The counterknife shaft unit also may be located at any position between the first and second positions to locate the counterknives 134 at intermediate locations relative to the cutting knives 126.

The counterknife shaft unit may comprise a single part, or an assembly of parts. In the shown embodiment, the counterknife shaft unit comprises a counterknife shaft 128 having a circular or other geometric profile (e.g. square or hexagonal), and the knife holders 132 are separate parts that are secured to the counterknife shaft 128 by removable fasteners 148 (e.g., bolts, pins, etc.) or by permanent fixation (e.g., welding). Other alternatives and embodiments will be apparent to persons of ordinary skill in the art in view of the present disclosure.

As noted above, the inventors have determined that a problem can arise when residue becomes trapped between a conventional counterknife moving system and the cutting chamber housing outer surface 120', in that the trapped residue can impede the motion of the mechanism that moves the counterknives into the engaged position. Such residue becomes compressed as the mechanism moves, and can form a dense mass that becomes difficult or impossible to compress as the mechanism is repeated operated. This leads to increased power requirements, the need for service, and possible damage to the parts.

To address this issue of trapped residue, the counterknife shaft unit is configured to reduce the likelihood of trapping residue where it can impede the motion of the counterknife moving system. In general terms, this is done by locating the counterknife shaft rotation axis 136 and configuring the parts such that the clearance between the counterknife shaft unit and the lower surface 120' of the cutter housing 120 stays the same (or does not decrease) as the counterknife shaft unit is moved to the second position. An example of this operation is illustrated in FIGS. 5 and 6.

Figure 5:
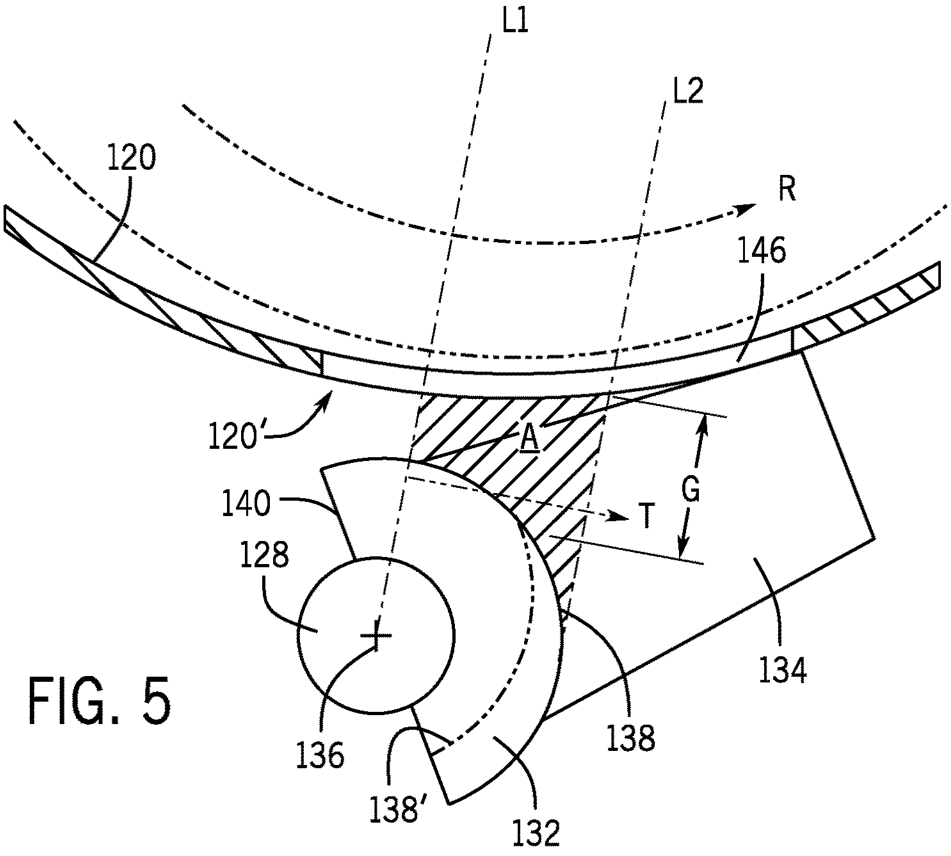
FIG. 5 is a schematic illustration of a residue counterknife assembly in a retracted position.
Figure 6:
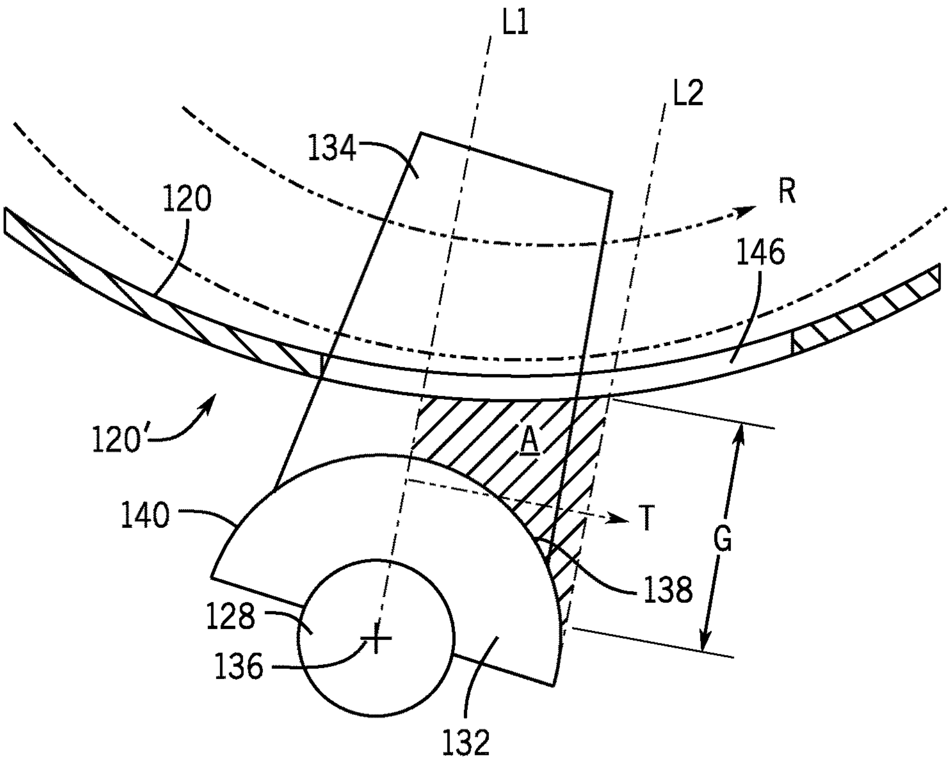
FIG. 6 is a schematic illustration of a residue counterknife assembly in an extended position.

FIG. 5 shows the counterknife shaft unit in the first position, with the counterknives 134 in the retracted position. FIG. 6 shows the counterknife shaft unit in the second position, with the counterknives 134 in the extended position. FIGS. 5 and 6 illustrate, as a hatched region, a trailing area A defined by an outer face 138 of the counterknife shaft unit and the outer surface 120' of the cutting chamber housing 120. The trailing area A extends between a first line L1 extending from the cutting knife rotation axis 124' to the counterknife shaft rotation axis 136, and a second line L2 that is parallel to the first line L1, and spaced from the first line L1 along a tangent T to the cutting direction R. At any given instant as the counterknife shaft unit rotates, the second line L2 is located in the tangential direction T at the furthest point of the portion of the outer face 138 that is oriented to face the outer surface 120' of the cutting chamber 120. In this case, the outer face 138 is has a continuous semicircular profile that is centered on the countershaft rotation axis 136, so line L2 remains at the same location. Regardless of how it is defined geometrically, the area A is the region in which rotation of the counterknife shaft unit has the potential to compress residue against the outer surface 120' of the chopper housing 120.

The outer face 138 of the counterknife shaft unit is configured such that that a gap G distance between the outer face 138 and the outer surface 120' of the chopper housing 120 (as measured parallel to the first line L1) does not decrease or increases as the counterknife shaft unit is rotated from the first position to the second position. In this case, the outer face 138 is semicircular and concentric with the counterknife shaft rotation axis 136. Thus, the gap distance G at any given location remains constant throughout the range of travel. A scraper 142 may be provided to contact the outer face 138 as it rotates to help remove any residue that might cling to the outer face 138.

In other cases, some or all of the outer face 138 may converge towards the counterknife shaft rotation axis 136, such as shown by the dashed line 138'. In this case, the second line L2 moves closer to the counterknife shaft rotation axis 136 as the counterknife shaft unit moves towards the second position. However, as in the first example, the gap distance G does not decrease at any location within the trailing area A.

Portions of the outer face 138 that do not form a boundary of the trailing area A during rotation of the counterknife shaft rotation may have any shape. For example, a leading portion 140 of the outer face 138 is located on an upstream side of the first line L1 when the counterknife shaft unit is in the first position. (As used herein, the upstream side is opposite the second line L2.) The entire leading portion 140 moves away from the outer surface 120' of the cutting chamber housing 120 as the counterknife shaft unit rotates from the first position to the second position. Thus, residue is not compressed by the leading portion 140 against the outer surface 120' as the counterknife shaft unit rotates from the first position to the second position, and any shape may be used without risk of such compression (compression might occur between the leading portion 140 and parts other than the outer surface 120', but those other parts optionally may be spaced to avoid detrimental compression). In this example, the leading portion 140 comprises a short semicircular region, and a flat region that converges radially towards the counterknife shaft rotation axis 136 to define a flat surface that can push residue away from the outer surface 120' of the cutting chamber housing 120.

In other embodiments, the semicircular outer face 138 may be part of a complete circular face. Also, the outer face 138 also may connect to surfaces that extend away from the counterknife shaft rotation axis 136, but do not form part of the trailing area A as the counterknife shaft unit rotates between the first position and the second position. Other alternatives and embodiments will be apparent to persons of ordinary skill in the art in view of the present disclosure.

The outer face 138 may be formed as an integral part of the counterknife shaft, or as surfaces on parts that are secured to the counterknife shaft 138. For example, the outer face 138 may be an outer surface of the knife holder 132 that is secured to and protrudes radially from the counterknife shaft 138.

The outer face 138 of the counterknife shaft unit may be defined as a collection of discrete outer faces segments that are spaced along the counterknife shaft rotation axis 136. For example, a collective outer face 138 may be defined by respective outer face portions of a plurality of knife holders 132 that are mounted to or formed as part of the counterknife shaft 138, and located next to each other along the counterknife shaft rotation axis 136. In this case, the outer face portions may abut one another, or there may be gaps between them along the counterknife shaft rotation axis 136.

It is preferred for the entire length of the counterknife shaft unit to have an outer face 138 that is configured such that the gap distance G within the trailing area A at every point along the counterknife shaft unit remains constant or increases in size as the counterknife shaft unit is rotated from the first position to the second position. However, this is not strictly required. For example, one or more protrusions (e.g., fastener heads, mounting collars, etc.) may extend from the counterknife shaft 128 at discrete locations along its length to form areas where the gap distance G decreases in size as the counterknife shaft unit rotates towards the second position.

As shown in FIGS. 5 and 6, the chopper housing 120 includes counterknife slots 146 through which the counterknives 134 move to enter into and retract from the cutting chamber 122. In some embodiments, such as those shown in FIGS. 2-6, the counterknives 134 are configured such that they are located directly between the counterknife shaft rotation axis 136 and the cutting knife rotation axis 124' when the counterknife shaft unit is in the second position (see FIGS. 2 and 6).

Figure 7:
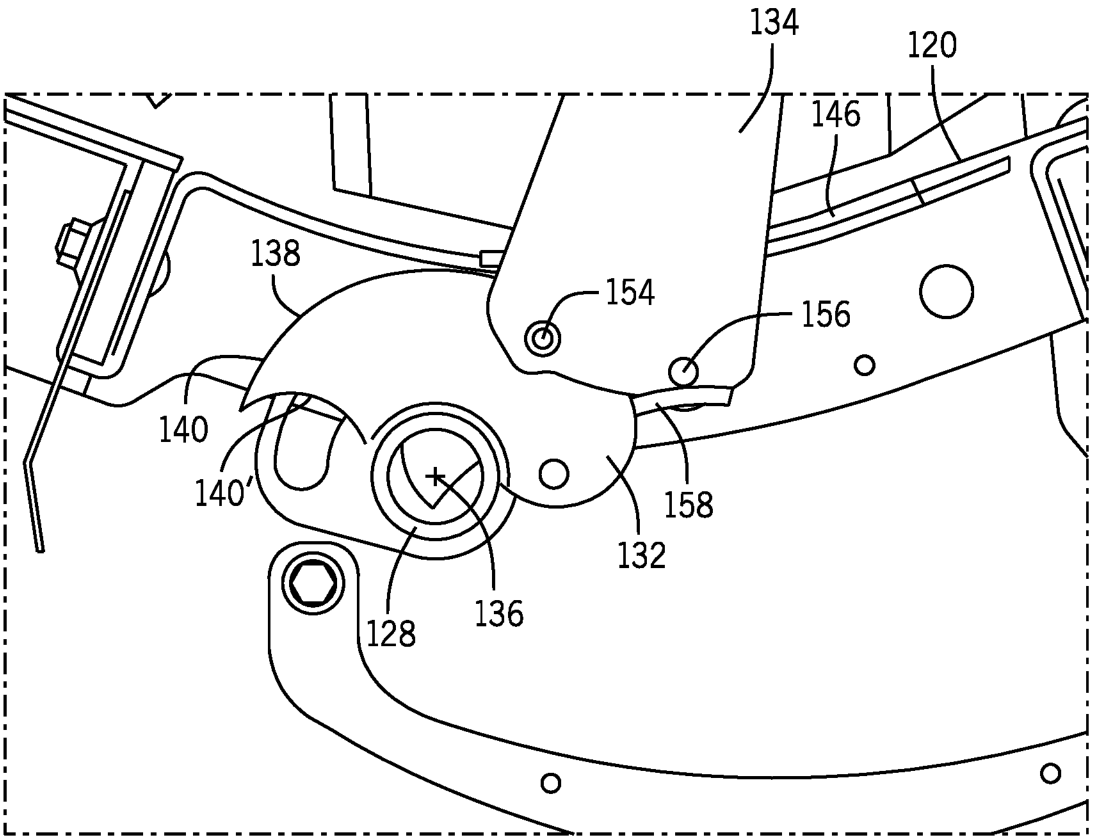
FIG. 7 is a cross-section view of another embodiment of a residue counterknife assembly.

Referring to FIG. 7, another example of a counterknife assembly is shown. This embodiment is generally the same as the previous embodiment, but differs in some respects.

First, the leading portion 140 of the outer face 138 defines a residue pushing surface that has a concave face 140'. The concave face 140' is hooked in the forward direction (i.e., forward as the counterknife shaft unit rotates towards the second position), so that it tends to pull residue towards the counterknife shaft rotation axis 136. This is expected to improve residue clearing.

Second, the counterknife 134 is secured at a trailing position relative to the knife holder 132, such that the counterknife 134 does not necessarily extend directly between the counterknife shaft rotation axis 136 and the blade shaft rotation axis 124' when the counterknife shaft unit is in the second position.

Third, the trailing position of the counterknife 134 can be helpful to integrate an overload breakaway mechanism into the assembly. An overload breakaway mechanism (not shown) allows the counterknife 134 to retract into the counterknife slot 146 while the counterknife shaft unit remains in the second position. This can be helpful to prevent relatively solid objects from being trapped between the cutting blades 126 and the counterknives 134. With the trailing position in FIG. 7, the counterknife 134 can be securely connected to the knife holder 132 at a front pivot 154, and releasably connected to the knife holder 132 at breakaway rear connector 156, such as a bolt that spans a leaf spring 158 extending from the knife holder. The leaf spring 158 is configured to yield and allow the rear connector 156 to pass when the counterknife 134 experiences an excess load. When this happens the counterknife 134 pivots backwards about the front pivot 154. and retracts into the counterknife slot 146. While the embodiment in FIGS. 2-6 can also include an overload breakaway mechanism, the embodiment of FIG. 7 is expected to help minimize overall size requirements for the desired amount of counterknife retraction range of motion.

It will appreciated that embodiments may be provided to the market in various states of assembly. For example, one embodiment may be provided as a counterknife assembly having a blocking surface as described herein, which may be provided with or without blades and fasteners. Another embodiment may be provided as an assembly of a counterknife shaft having counterknife assemblies. Another embodiment may be provided as a counterknife system having a counterknife shaft, counterknife assemblies, a chopper pan, and other parts, which can be installed in an existing harvester. Another embodiment may be provided as a towed agricultural harvester machine having a powered residue chopper with a counterknife system as described herein. Another embodiment may be provided as a self-propelled agricultural harvester including a threshing and separating system, powered drive wheels, and counterknife system as described herein. Other alternatives and embodiments will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. For example, a counterknife as described and claimed herein may be used in conjunction with other, conventional counterknives, and so on. Also, features identified in the singular or by a specific number are not intended to be limited to a single features or the described number of features unless specifically recited as being present only in the specified quantity.

The invention claimed is:

1. An agricultural residue chopper assembly comprising:

a cutting chamber housing defining a cutting chamber therein;

a plurality of cutting knives mounted to rotate along a cutting direction within the cutting chamber about a cutting knife rotation axis;

a counterknife shaft unit mounted at a fixed location relative to an outer surface of the cutting chamber housing, wherein the counterknife shaft unit is rotatable about a counterknife shaft rotation axis through a range of motion between a first position and a second position, and wherein the counterknife shaft rotation axis extends parallel to the cutting knife rotation axis;

an outer face defined by a portion of the counterknife shaft unit;

one or more counterknives secured to the counterknife shaft unit and extending radially outward from the outer face, wherein the one or more counterknives are spaced a first distance from the cutting knife rotation axis when the counterknife shaft unit is in the first position, and a second distance from the cutting knife rotation axis when the counterknife shaft unit is in the second position, and the second distance is less than the first distance;

wherein:

the outer face and the outer surface of the cutting chamber housing define a trailing area located between a first line extending between the cutting knife rotation axis and the counterknife shaft rotation axis, and a second line that is parallel to the first line and spaced from the first line along a tangent to the cutting direction, and the outer face is configured such that a gap distance, as measured parallel to the first line, between the outer face and the outer surface of the cutting chamber housing at all locations within the trailing area remains constant or increases in size as the counterknife shaft unit is rotated from the first position to the second position.

2. The agricultural residue chopper assembly of claim 1, wherein at least a portion of the one or more counterknives is located directly between the counterknife shaft rotation axis and the cutting knife rotation axis when the counterknife shaft unit is in the second position.

3. The agricultural residue chopper assembly of claim 1, wherein a leading portion of the outer face is located on an upstream side of the first line relative to the cutting direction when the counterknife shaft unit is in the first position, and the leading portion extends inward from the outer face towards the counterknife shaft axis to define a residue pushing surface.

4. The agricultural residue chopper assembly of claim 3, wherein the residue pushing surface comprises a concave face.

5. The agricultural residue chopper assembly of claim 1, wherein a portion of the outer face located in the trailing area throughout the range of motion is semicircular and concentric with the counterknife shaft rotation axis.

6. The agricultural residue chopper assembly of claim 1, wherein the one or more counterknives are completely outside the cutting chamber when the counterknife shaft unit is in the first position.

7. The agricultural residue chopper assembly of claim 1, wherein the cutting chamber housing comprises a counter-knife slot configured to receive one of the one or more counterknives located directly between the counterknife shaft rotation axis and the cutting knife rotation axis when the counterknife shaft unit is in the second position.

8. The agricultural residue chopper assembly of claim 1, wherein the counterknife shaft unit comprises:
a counterknife shaft; and
at least one knife holder connected to and extending radially from the counterknife shaft;
wherein the outer face is defined by the at least one knife holder.

9. The agricultural residue chopper assembly of claim 1, wherein the counterknife shaft unit comprises:
a counterknife shaft; and
a plurality of knife holders connected to and extending radially from the counterknife shaft and spaced along the counterknife shaft rotation axis;
wherein each of the plurality of knife holders comprises a respective portion of a collective outer face.

10. The agricultural residue chopper assembly of claim 1, further comprising an overload breakaway connection joining the one or more counterknives to the counterknife shaft unit.

11. An agricultural harvester machine comprising:
a chassis configured for movement on a surface; and
a residue chopper comprising:
a cutting chamber housing defining a cutting chamber therein;
a plurality of cutting knives mounted to rotate along a cutting direction within the cutting chamber about a cutting knife rotation axis;
a counterknife shaft unit mounted at a fixed location relative to an outer surface of the cutting chamber housing, wherein the counterknife shaft unit is rotatable about a counterknife shaft rotation axis through a range of motion between a first position and a second position, and wherein the counterknife shaft rotation axis extends parallel to the cutting knife rotation axis;
an outer face defined by a portion of the counterknife shaft unit;
one or more counterknives secured to the counterknife shaft unit and extending radially outward from the outer face, wherein the one or more counterknives are spaced a first distance from the cutting knife rotation axis when the counterknife shaft unit is in the first position, and a second distance from the cutting knife rotation axis when the counterknife shaft unit is in the second position, and the second distance is less than the first distance;
wherein:
the outer face and the outer surface of the cutting chamber housing define a trailing area located between a first line extending between the cutting knife rotation axis and the counterknife shaft rotation axis, and a second line that is parallel to the first line and spaced from the first line along a tangent to the cutting direction, and
the outer face is configured such that a gap distance, as measured parallel to the first line, between the outer face and the outer surface of the cutting chamber housing at all locations within the trailing area remains constant or increases in size as the counterknife shaft unit is rotated from the first position to the second position.

12. The agricultural harvester machine of claim 11, further comprising:
a threshing and separating system attached to the chassis and configured to deliver crop residue to the residue chopper; and
powered wheels configured to move the chassis on the surface.

* * * * *